(12) United States Patent
Weng (10) Patent No.: US 8,692,483 B2
(45) Date of Patent: Apr. 8, 2014

(54) INTELLIGENT POWER CONTROL SYSTEM

(75) Inventor: Linsong Weng, Hsinchu County (TW)

(73) Assignees: Ginger Technology Co., Ltd., Hsinchu County (TW); Linsong Weng, Hsinchu County (TW)

(*) Notice: Subject to any disclaimer, the term of this patent is extended or adjusted under 35 U.S.C. 154(b) by 145 days.

(21) Appl. No.: 13/304,453

(22) Filed: Nov. 25, 2011

(65) Prior Publication Data

US 2013/0134883 A1 May 30, 2013

(51) Int. Cl.
*H05B 37/02* (2006.01)
(52) U.S. Cl.
USPC .......................................... 315/307; 315/122
(58) Field of Classification Search
USPC ...... 315/307, 185 R, 192, 210, 312, 122, 152
See application file for complete search history.

(56) References Cited

U.S. PATENT DOCUMENTS

2007/0273290 A1* 11/2007 Ashdown et al. ............. 315/113
2009/0189530 A1* 7/2009 Ashdown et al. ............. 315/152

\* cited by examiner

*Primary Examiner* — Daniel D Chang
(74) *Attorney, Agent, or Firm* — Rosenberg, Klein & Lee (57) ABSTRACT

An intelligent power control system connects with a LED power adaptor and a LED light string and drives the LED light string to emit light. The intelligent power control system comprises a sensing-modulating-setting (SMS) unit and a digital power control unit. The SMS unit detects an infrared signal and generates a plurality of brightness-selection signals. The digital power control unit connects with the SMS unit and regulates the output power thereof according to the infrared signal and the brightness-selection signal of the SMS unit to modulate the brightness of the light emitted by the LED light string. The intelligent power control system can stepwise modulate the brightness of the LED light string to reduce power consumption without using any expensive sensor.

23 Claims, 11 Drawing Sheets

INTELLIGENT POWER CONTROL SYSTEM

BACKGROUND OF THE INVENTION

1. Field of the Invention

The present invention relates to an intelligent power control system, particularly to a power control system, which uses an external DC power source to control a LED light string to emit lights of different brightnesses.

2. Description of the Related Art

Since house design is evolving with increasing people's life quality, lighting plays a very important role in house design. Compared with the incandescent lamps, LED lamps are characterized by long service life, high power efficiency, high luminous efficiency, high reliability, high compatibility and low failure rate. Therefore, LED lamps have become the mainstream in the market.

A conventional LED lamp device normally has a LED lamp and a power adaptor. The power adaptor transforms commercial AC power into DC power to drive the LED lamp. The conventional incandescent lamp can dim continuously with decreased power. Therefore, the conventional incandescent lamp can provide different illuminations for different occasions at different timings to fulfill the requirement of mood or power efficiency. However, the conventional LED lamp can only be either on or off, depending on whether power is supplied. Therefore, the conventional on/off-only LED lamp can neither provide appropriate moods for houses or shops nor meet the requirement of power efficiency promotion and carbon emission reduction.

Accordingly, the persons skilled in the art are eager to develop a LED power control technology not only able to solve the abovementioned problems but also able to automatically modulate the brightness of LED lamps.

SUMMARY OF THE INVENTION

The primary objective of the present invention is to provide an intelligent power control system, which connects with a LED power adaptor and a LED light string, and which uses an external DC power source to drive the LED light string to emit light, and which senses the infrared signals of the environment to regulate the output power thereof and vary the brightness of the LED light string.

Another objective of the present invention is to provide an intelligent digital power control system, which saves power via regulating brightness of lights according to the infrared signal and illumination of the environment.

A further objective of the present invention is to provide an intelligent digital power control system, which uses at least one sensor and/or at least one digital power control unit to control the brightness to realize a group-control function for LED light strings.

To achieve the abovementioned objectives, the present invention proposes an intelligent digital power control system, which connects between a LED power adaptor and a LED light string and drives the LED light string to emit light. The intelligent digital power control system comprises a sensing-modulating-setting (SMS) unit and a digital power control unit. The SMS unit senses an infrared signal and generates a plurality of brightness-selection signals. The digital power control unit connects with the SMS unit. According to the infrared signal and the brightness-selection signal of the SMS unit, the digital power control unit modifies its output power to vary the brightness of the LED light string.

In one embodiment, the SMS unit includes a light modulator and at least one infrared sensor. The light modulator has a signal-processing unit, a signal detection unit, a digital control signal output unit, and a brightness-setting unit. The signal-processing unit connects with the signal detection unit, the digital control signal output unit, and the brightness-setting unit. The brightness-setting unit generates the abovementioned brightness-selection signals. Each brightness-selection signal is corresponding to a delay time. The infrared sensor connects with the signal detection unit. According to the detection result of the infrared sensor and the delay time corresponding to each brightness-selection signal, the signal-processing unit modifies the level of a voltage output by the digital control signal output unit to regulate the brightness of the light emitted by the LED light string.

In one embodiment, the light modulator and the infrared sensors are integrated on a light-modulation SOC (System on Chip).

Below, the embodiments are described in detail in cooperation with the attached drawings to make easily understood the objectives, technical contents, characteristics and accomplishments of the present invention.

DETAILED DESCRIPTION OF THE INVENTION

The present invention proposes an intelligent power control system, which uses the DC power supplied by a LED power adaptor to drive a LED light string and control the brightness of the light emitted by the LED light string.

The intelligent power control system of the present invention promotes power efficiency via modulating brightness of a LED light string according to environmental infrared signals and environmental brightness.

Figure 1:
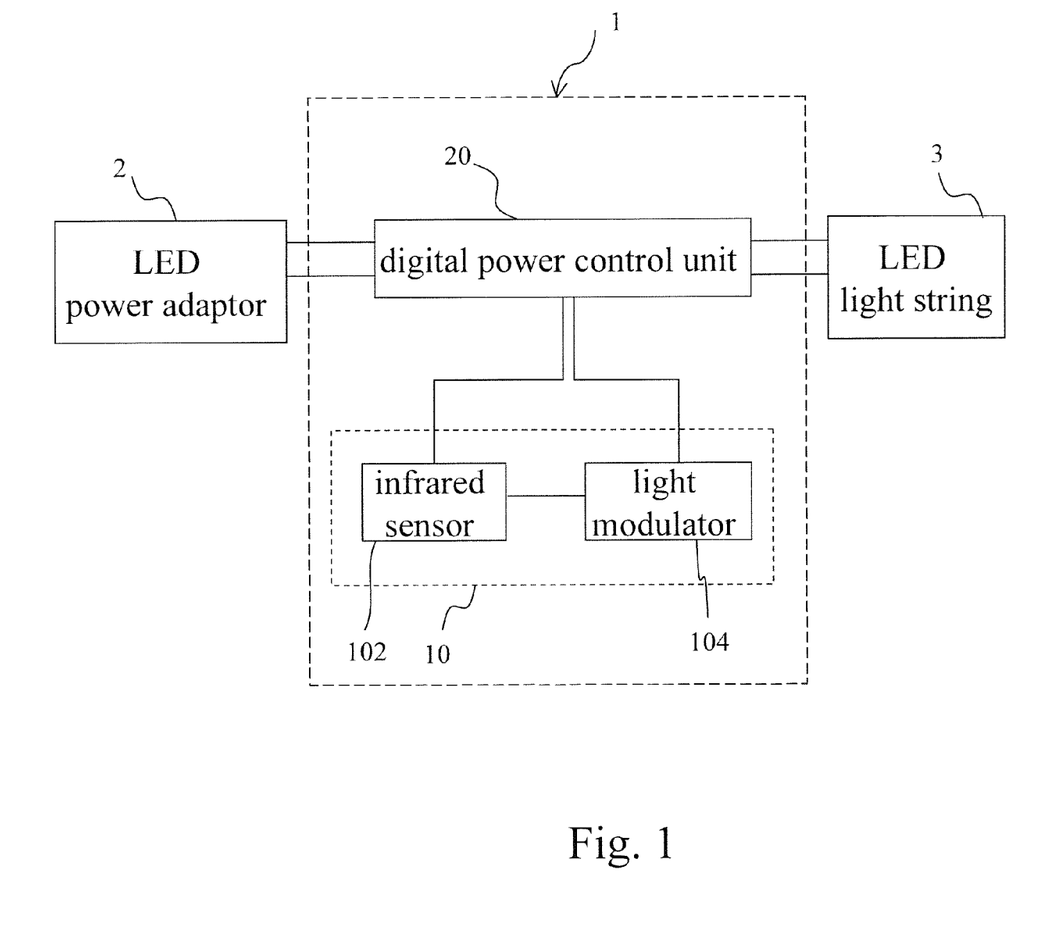
FIG. 1 is a block diagram schematically showing an intelligent power control system according to one embodiment of the present invention.

Refer to FIG. 1, which is a block diagram schematically showing an intelligent power control system according to one embodiment of the present invention. The intelligent power control system 1 of the present invention connects between a LED power adaptor 2 and a LED light string 3 and drives the LED light string 3 to emit light.

In one embodiment, the intelligent power control system 1 comprises a sensing-modulating-setting (SMS) unit 10 and a digital power control unit 20. The SMS unit 10 includes an infrared sensor 102 and a light modulator 104. The SMS unit 10 senses infrared signals and generates at least one brightness-selection signal. The digital power control unit 20 connects with the SMS unit 10. According to the infrared signal and the brightness-selection signal of the SMS unit 10, the digital power control unit 20 regulates its output power to vary the brightness of the light emitted by the LED light string 3.

Figure 2:
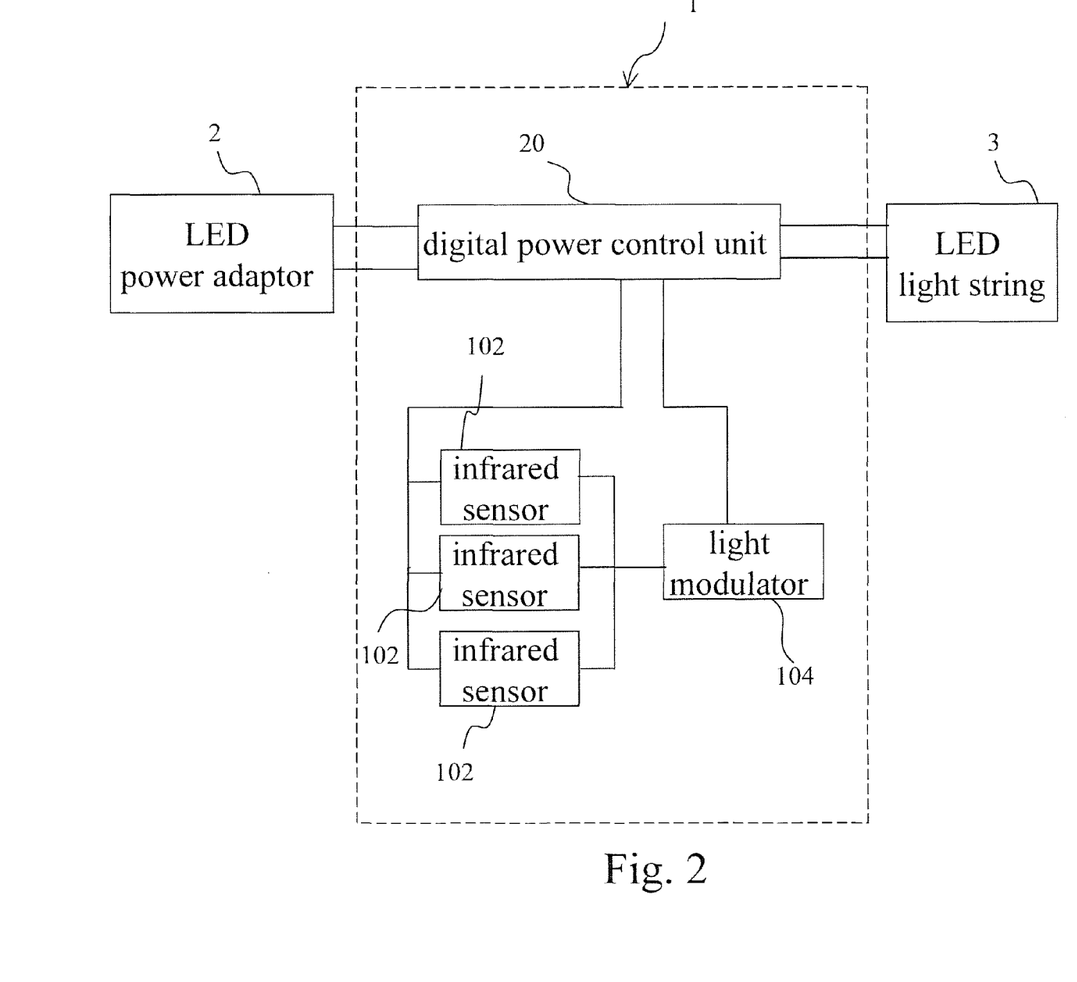
FIG. 2 is a block diagram schematically showing an intelligent power control system having a plurality of infrared sensors according to one embodiment of the present invention.

It should be noted that the present invention does not restrict the SMS unit 10 to have only a single infrared sensor 102. In one embodiment, the SMS unit 10 has a plurality of infrared sensors 102 providing multiple input signals for the system, as shown in FIG. 2. The present invention is exemplified by the embodiment shown in FIG. 1 thereinafter. However, the persons skilled in the art should be able to achieve the embodiment shown in FIG. 2 easily according to the technology disclosed in the specification. Therefore, the embodiment shown in FIG. 2 is also included within the scope of the present invention.

Figure 3:
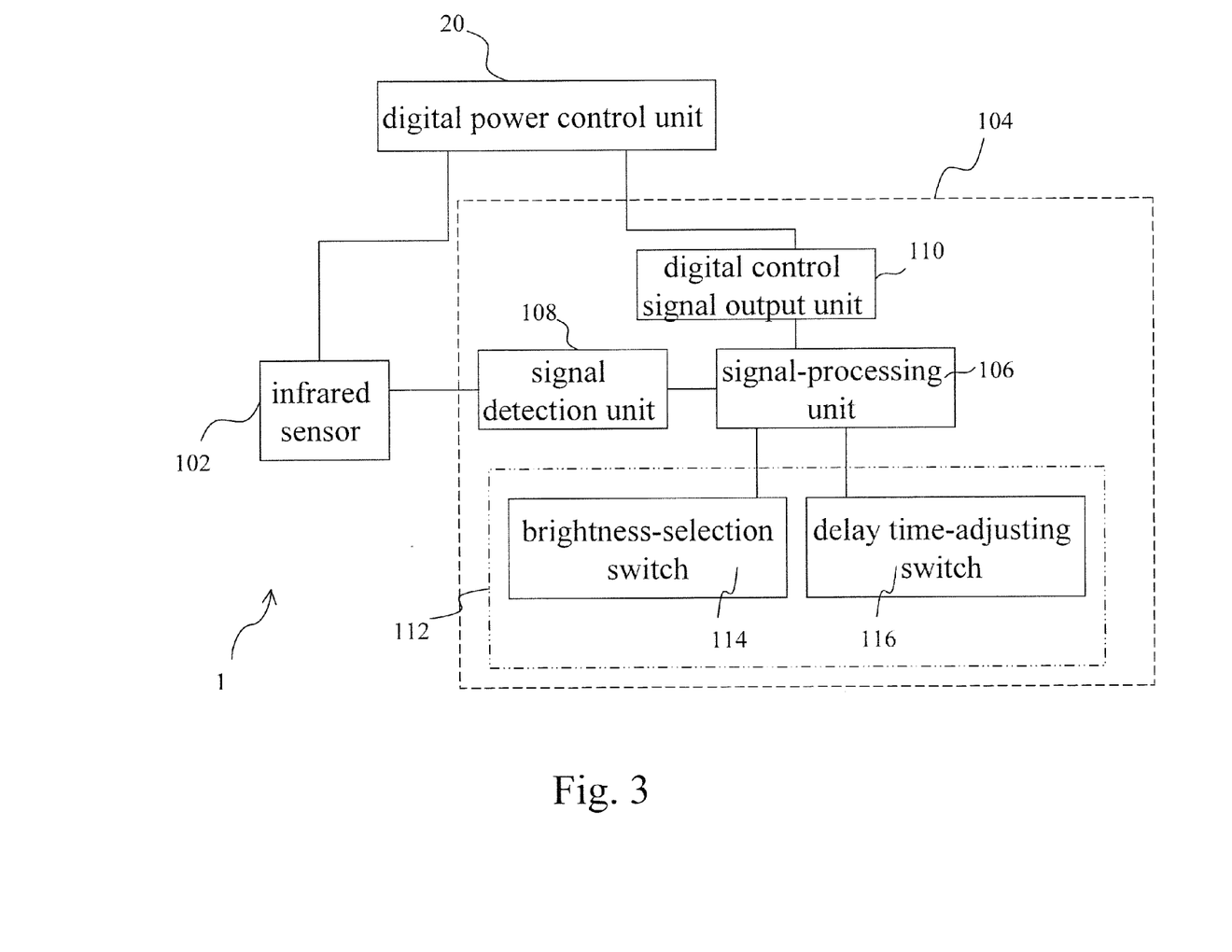
FIG. 3 is a block diagram schematically showing a light modulator of an intelligent power control system according to one embodiment of the present invention.

Refer to FIG. 3, which is a block diagram schematically showing a light modulator of an intelligent power control system according to one embodiment of the present invention. The light modulator 104 has a signal-processing unit 106, a signal detection unit 108, a digital control signal output unit 110, and a brightness-setting unit 112. The signal-processing unit 106 separately connects with the signal detection unit 108, the digital control signal output unit 110, and the brightness-setting unit 112. The brightness-setting unit 112 has a brightness-selection switch 114 and a delay time-adjusting switch 116.

In one embodiment, the user can set the brightness-selection switch 114 to generate more than one brightness-selection signal. The delay time-adjusting switch 11 generates a variety of delay times each respectively corresponding to the brightness-selection signal.

The infrared sensor 102 connects with the signal detection unit 108. The user operates the brightness-setting unit 112 to generate one or more brightness-selection signals. The delay time-adjusting switch 116 generates the delay times respectively corresponding to the brightness-selection signals. According to the detection result of the infrared sensor 102 and the setting of the brightness-setting unit 112, the signal-processing unit 106 determines the amplitude of the power to be output. The digital control signal output unit 110 outputs the information of the output power to the digital power control unit 20. In the present invention, the digital control signal output unit 110 generates a digital signal to control the digital power control unit 20 to output the intended level of power, whereby is used to regulate the brightness of the light emitted by the LED light string 3.

For example, the user predetermines the brightness-selection signals to be 100%, 75% and 50%, i.e. the predetermined brightness levels of the light emitted by the LED light string 3 are 100%, 75% and 50%. Further, the user predetermines the delay time for 100% brightness is 1 minute, for 75% is 1.5 minutes, and for 50% is 0.5 minutes. When a person passes the detection range of the infrared sensor 102, the infrared sensor 102 notifies the digital power control unit 20 that a person passes the detection range. Then, the digital power control unit 20 supplies the maximum power, i.e. 100% power, to the LED light string 3.

Later, when the infrared sensor 102 detects that the person has left the detection range, then the LED light string 3 continues to emit light at 100% brightness for 1 minute (the delay time). Next, the LED light string 3 is automatically switched to emit light at 75% brightness for 1.5 minutes. And next, the LED light string 3 is automatically switched again to emit light at 50% brightness for 0.5 minutes. Finally, the LED light string 3 is automatically switched off. Therefore, the present invention can dim the LED light string 3 stepwise.

Figure 4A:
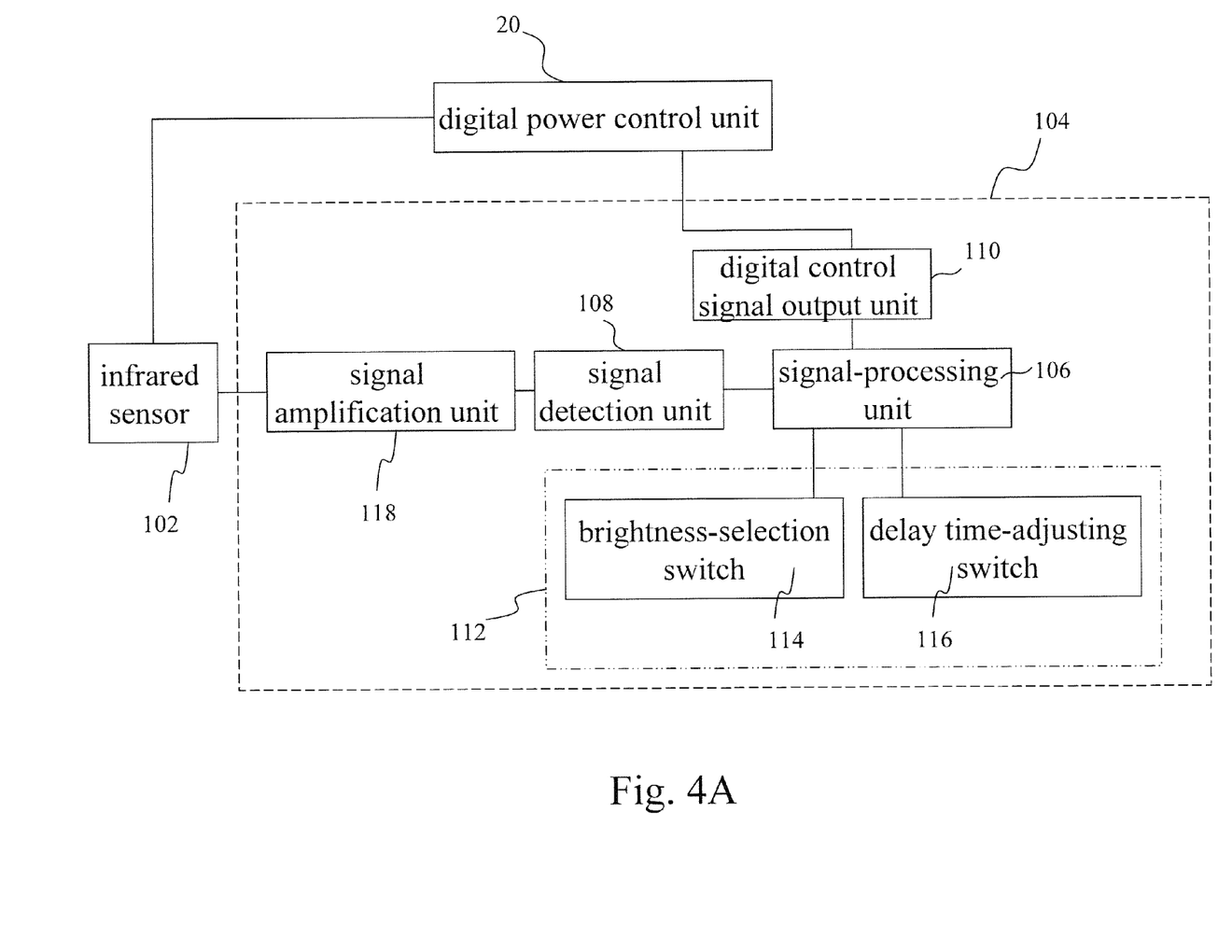
FIG. 4A schematically shows that a signal amplification unit and a light modulator are integrated in a light modulation module or a chip according to one embodiment of the present invention.
Figure 4B:
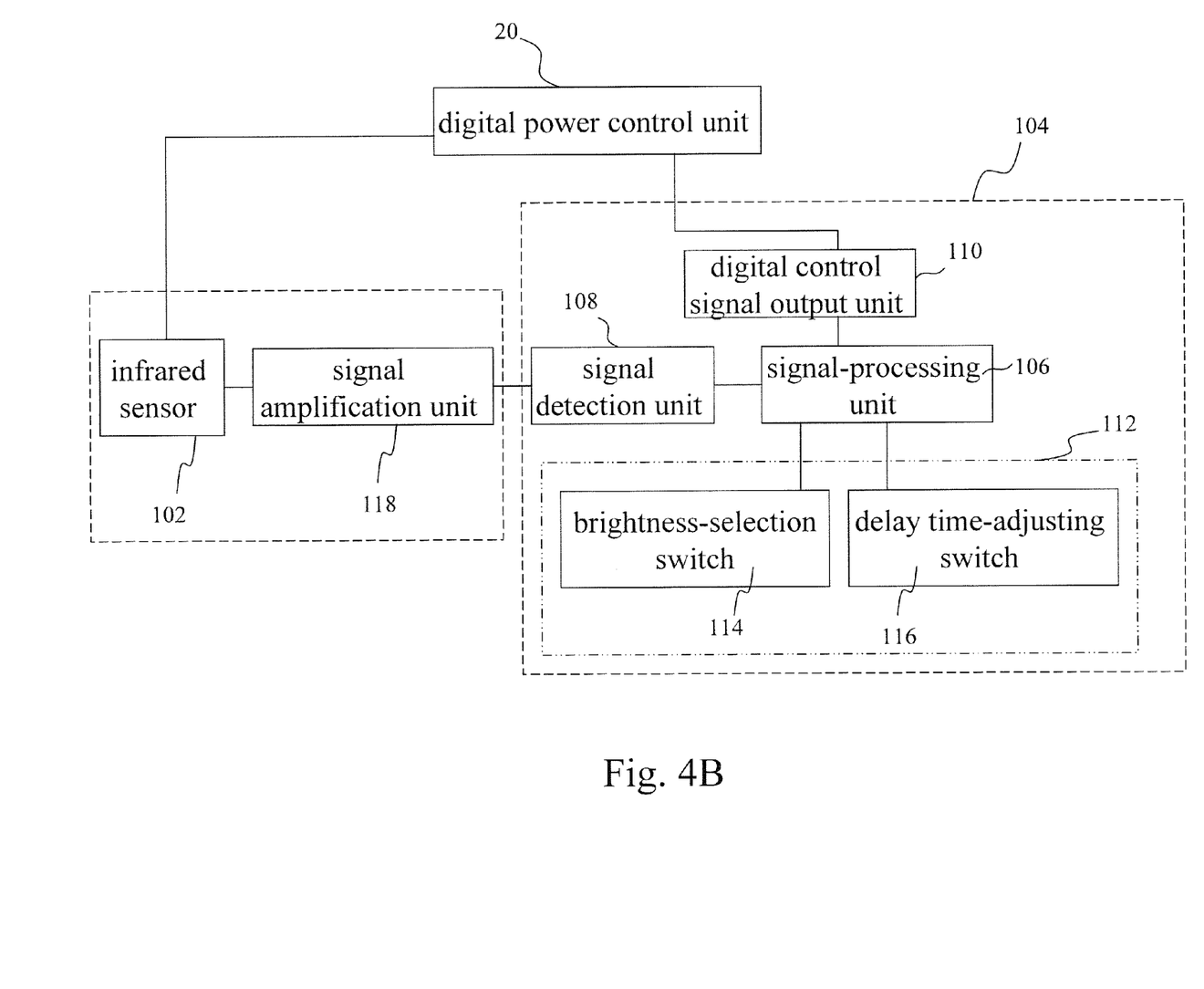
FIG. 4B schematically shows that a signal amplification unit and an infrared sensor are integrated in a light modulation module or a chip according to one embodiment of the present invention.

In one embodiment, the SMS unit 10 further includes a signal amplification unit 118 connected with the signal detection unit 108 and the signal amplification unit 118 is used to amplify the signal detected by the infrared sensor 102 and increase the detection accuracy. In one embodiment, the signal amplification unit 118 and the light modulator 104 can be integrated in a light modulation module or a chip, as shown in FIG. 4A. In another embodiment, the signal amplification unit 118 and the infrared sensor 102 can be integrated in a light modulation module or a chip, as shown in FIG. 4B.

Figure 5:
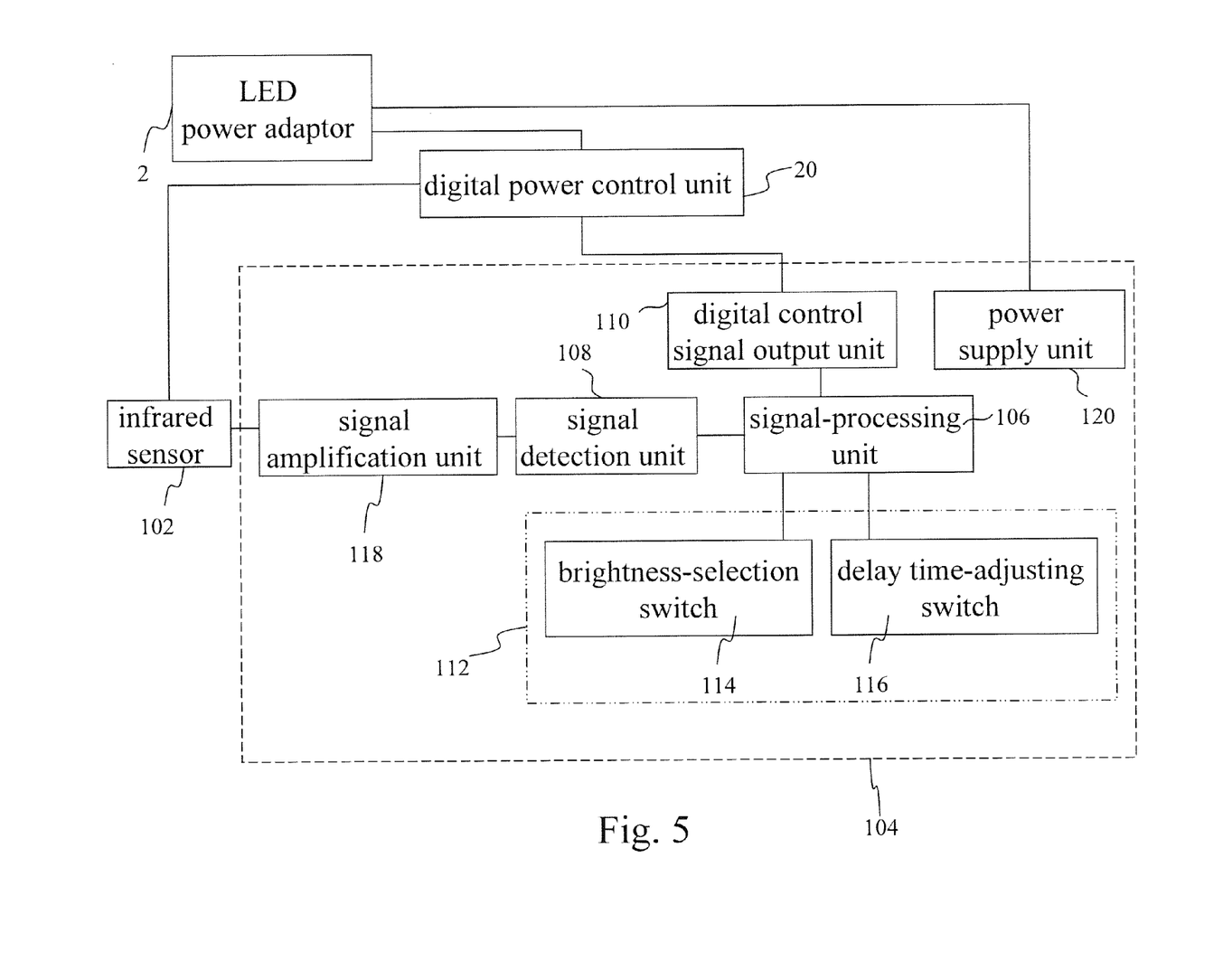
FIG. 5 is a block diagram schematically showing a light modulator having a power supply unit according to one embodiment of the present invention.

Refer to FIG. 5, which is a block diagram schematically showing a light modulator having a power supply unit according to one embodiment of the present invention. In this embodiment, the light modulator 104 has a power supply unit 120 connected with the LED power adaptor 2, whereby the light modulator 104 needn't be powered by the digital power control unit 20 but directly powered by the LED power adaptor 2.

Figure 6:
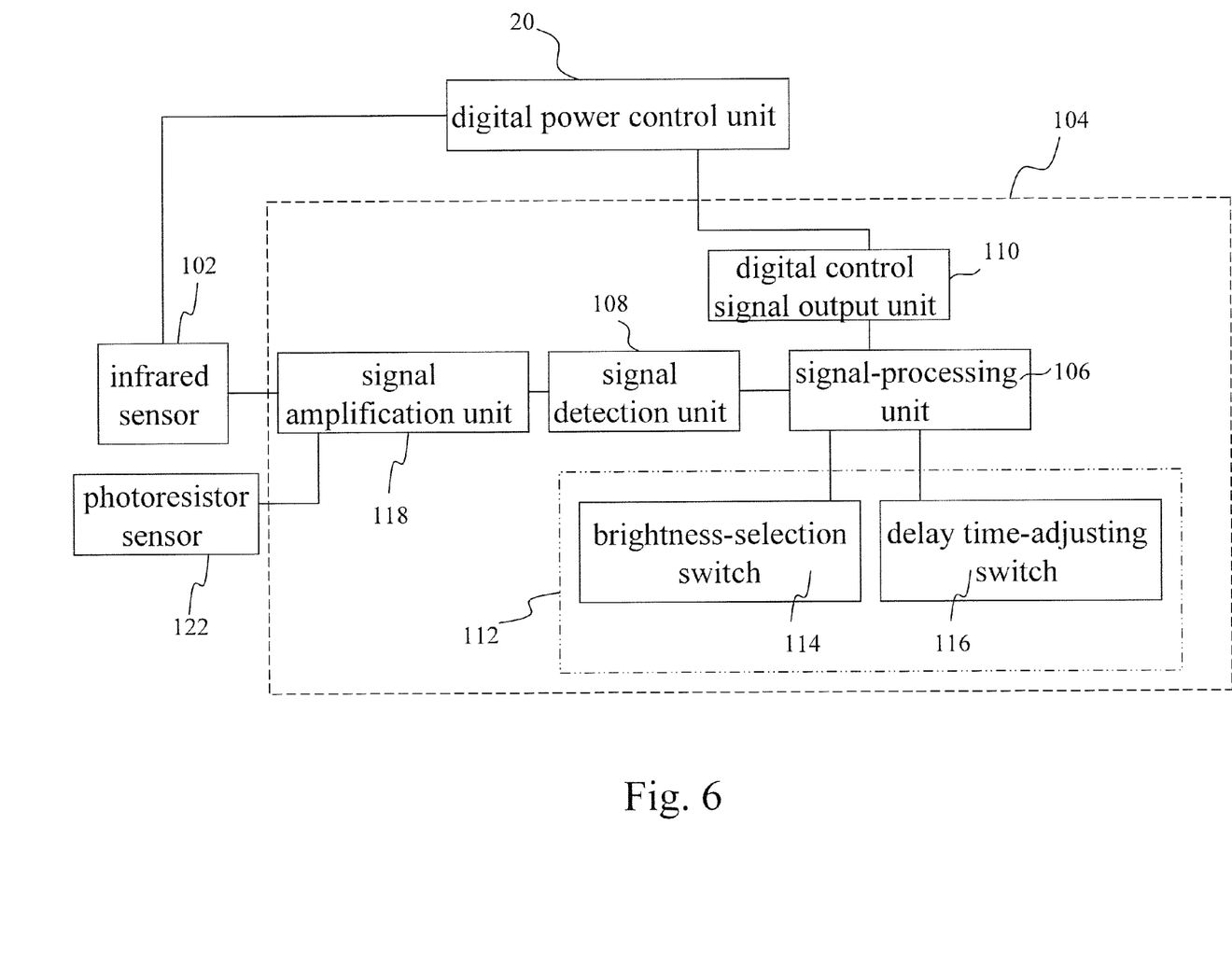
FIG. 6 is a block diagram schematically showing an intelligent power control system having a photoresistor sensor according to one embodiment of the present invention.

Refer to FIG. 6, which is a block diagram schematically showing an intelligent power control system having a photoresistor sensor according to one embodiment of the present invention. In this embodiment, the SMS unit 10 has a photoresistor sensor 122 to detect signals, in addition to the infrared sensor 102. The photoresistor sensor 122 is very sensitive to environmental illumination. In this embodiment, the photoresistor sensor 122 senses environmental brightness to implement brightness regulation and power consumption reduction of the LED light string 3.

In the abovementioned embodiment, when the photoresistor sensor 122 detects that the environmental brightness is lower than a specified value (for example, when the photoresistor sensor 122 detects that it is dark), the photoresistor sensor 122 informs the digital power control unit 20 of the information. Thus, the digital power control unit 20 outputs the maximum (100%) power to the LED light string 3. Then, the intelligent power control system 1 undertakes light modulation stepwise as described before according to the detection result of the infrared sensor 102 (for example, the infrared sensor 10 detects if a person passes the detection range thereof).

Figure 7:
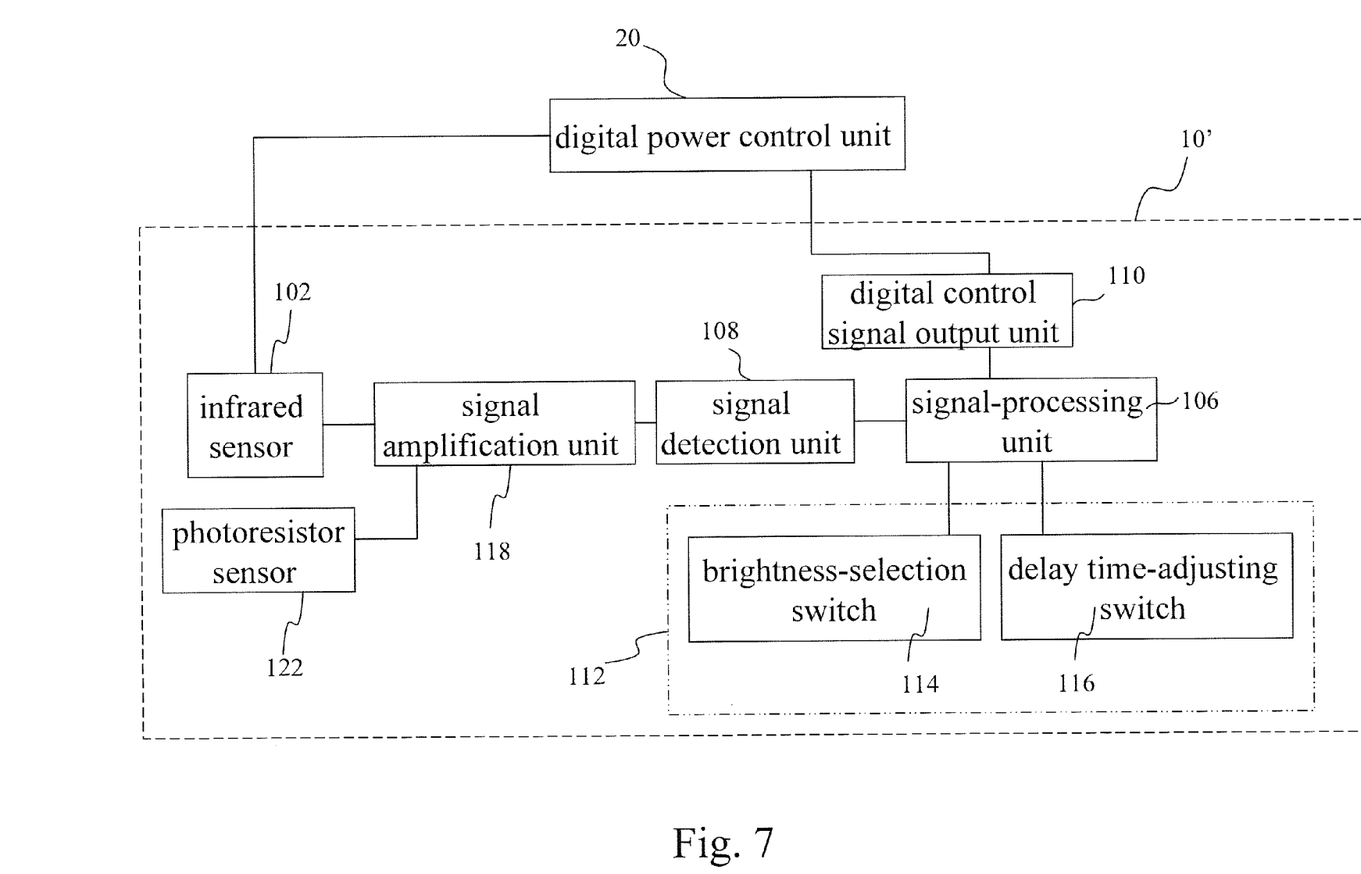
FIG. 7 schematically shows that the components of an intelligent power control system are integrated on a light-modulation SOC according to one embodiment of the present invention.

Refer to FIG. 7, which is a block diagram schematically showing the components of an intelligent power control system are integrated on a light-modulation SOC according to one embodiment of the present invention. In this embodiment, the abovementioned components, including the signal-processing unit 106, signal detection unit 108, digital control signal output unit 110, brightness-setting unit 112, signal amplification unit 118, infrared sensor 102 and photoresistor sensor 122, may be selectively integrated onto a light-modulation SOC 10'.

Figure 8:
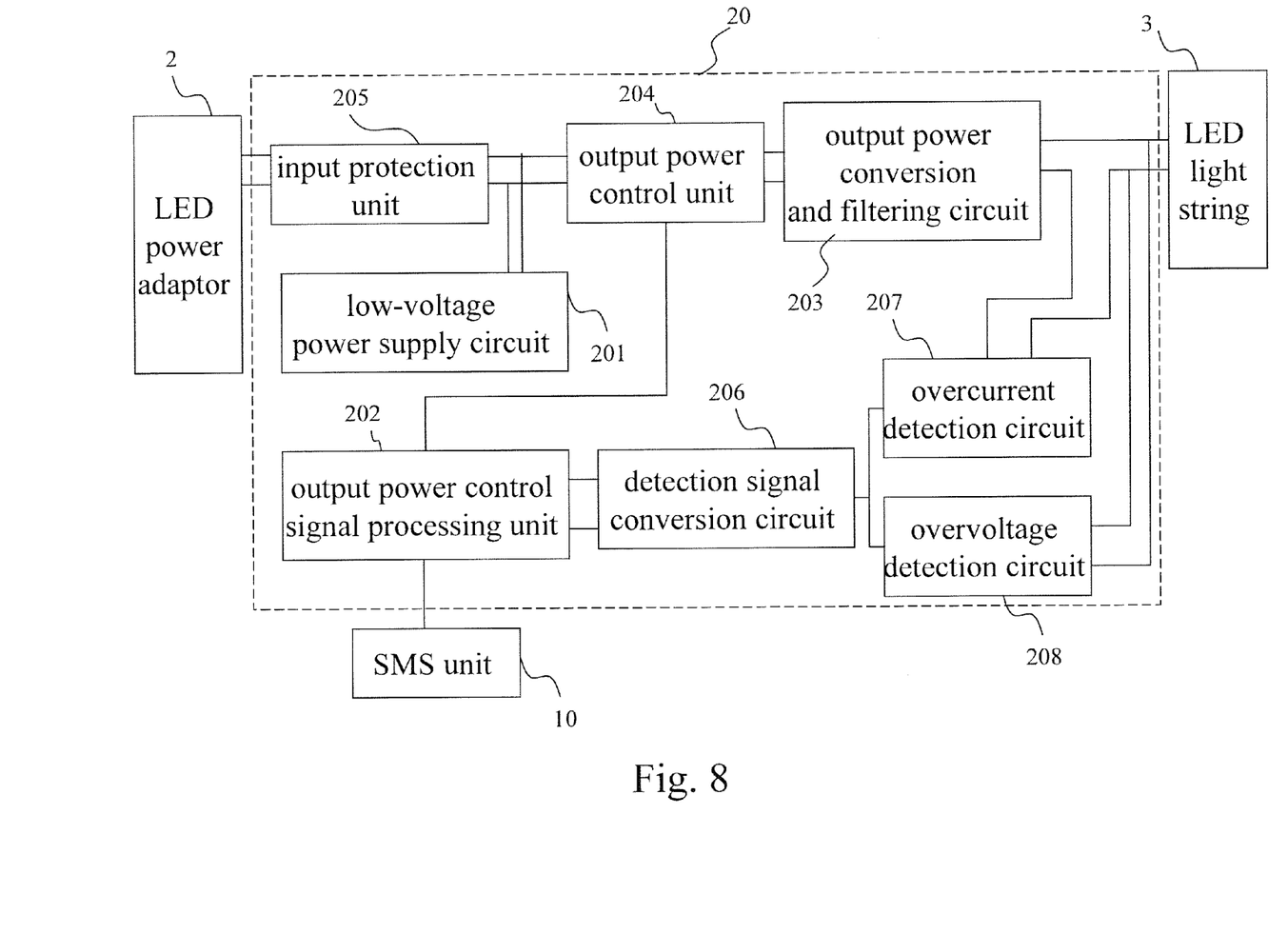
FIG. 8 is a block diagram schematically showing a digital power control unit of an intelligent power control system according to one embodiment of the present invention.

Refer to FIG. 8, which is a block diagram schematically showing a digital power control unit of an intelligent power control system according to one embodiment of the present invention. In this embodiment, the digital power control unit 20 includes a low-voltage power supply circuit 201, an output power control signal processing unit 202, an output power conversion and filtering circuit 203, an output power control unit 204, an input protection unit 205, a detection signal conversion circuit 206, an overcurrent detection circuit 207 and an overvoltage detection circuit 208.

The input protection unit 205 is connected with the LED power adaptor 2 and the low-voltage power supply circuit 201. The output power control signal processing unit 202 is connected with the SMS unit 10. The output power conversion and filtering circuit 203 is connected with the LED light string 3. The output power control unit 204 is connected with the low-voltage power supply circuit 201, output power control signal processing unit 202 and output power conversion and filtering circuit 203.

The output power control signal processing unit 202 is connected with the detection signal conversion circuit 206. The overcurrent detection circuit 207 and overvoltage detection circuit 208 are connected in parallel and each connected with the detection signal conversion circuit 206, output power conversion and filtering circuit 203 and LED light string 3.

Therefore, according to the infrared signal detected by the SMS unit 10 and the brightness-selection signals preset by the user, the digital power control unit 20 regulates its output power to modify the brightness of the LED light string 3.

Figure 9:
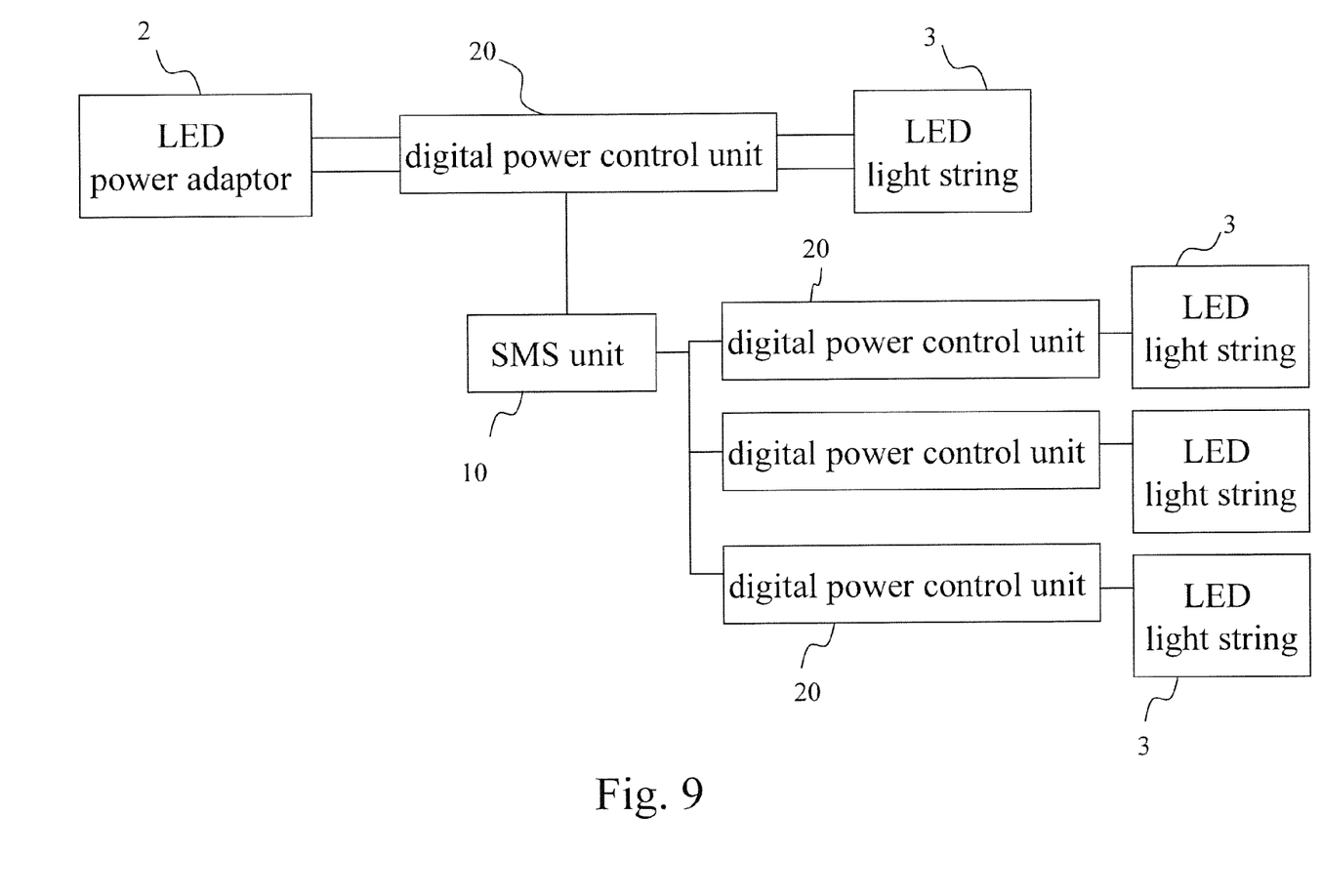
FIG. 9 is a block diagram schematically showing an intelligent power control system having a group-control function according to one embodiment of the present invention.

Refer to FIG. 9, which is a block diagram schematically showing an intelligent power control system having a group-control function according to one embodiment of the present invention. In this embodiment, the intelligent power control system of the present invention has a group-control function. The SMS unit 10 is connected with a plurality of digital power control units 20 and each digital power control units 20 is connected with a LED light string 3. Therefore, each digital power control unit 20 respectively controls the brightness of the lights emitted by the LED light string 3.

Figure 10:
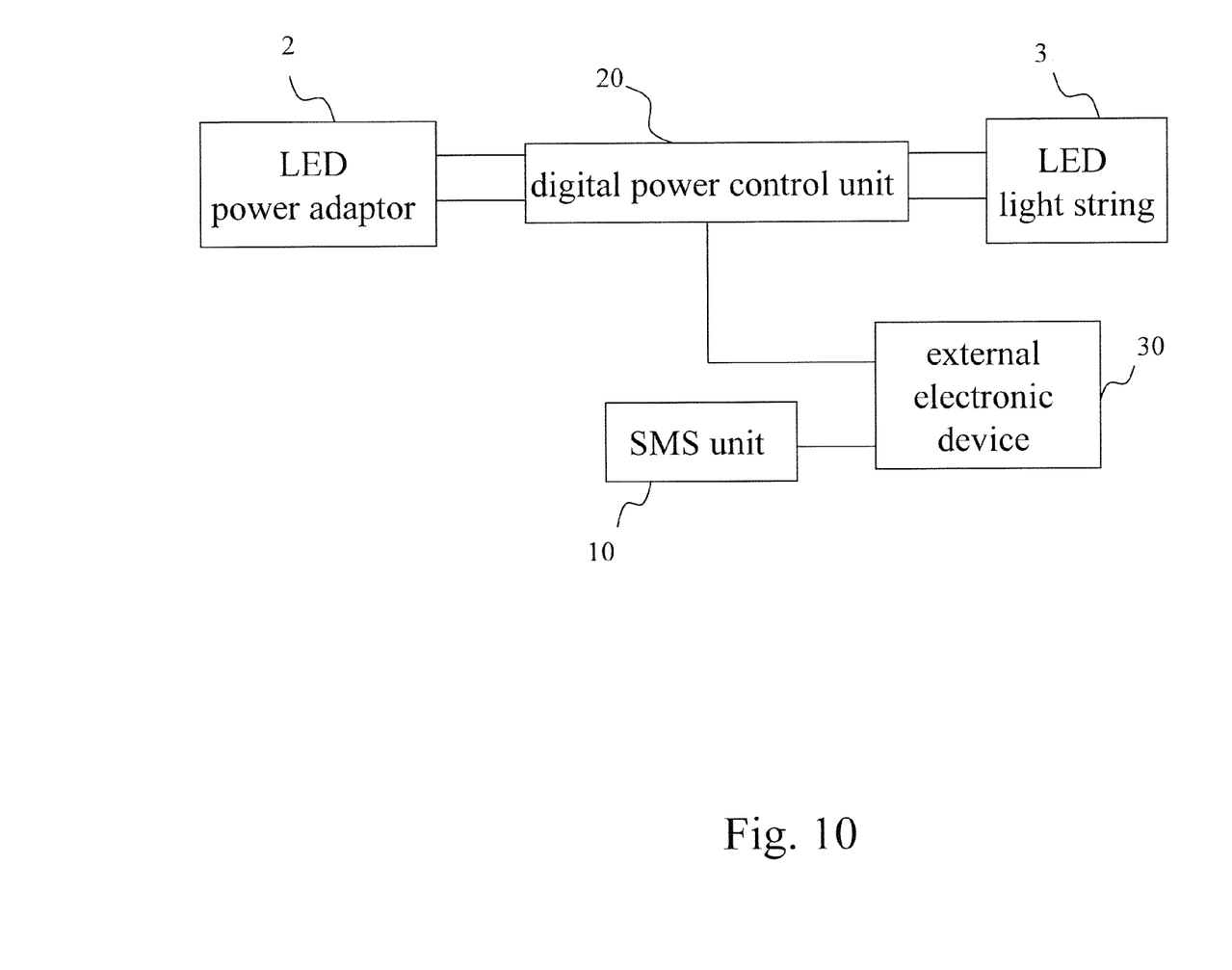
FIG. 10 is a block diagram schematically showing an intelligent power control system having an external electronic device according to one embodiment of the present invention.

Refer to FIG. 10, which is a block diagram schematically showing an intelligent power control system having an external electronic device according to one embodiment of the present invention. In this embodiment, the intelligent power control system of the present invention further comprises an external electronic device 30 connected between the SMS unit 10 and the digital power control unit 20. The external electronic device 30 may be a personal computer, a personal digital assistant, or a mobile phone. The external electronic device 30 receives and processes the signals output by the SMS unit 10 and then notifies the digital power control unit 20 to control the brightness of the light emitted by the LED light string 3.

In conclusion, the intelligent power control system of the present invention is an intelligent light-dimming device able to stepwise control the power output by a conventional LED power adaptor without using any expensive sensor.

The embodiments described above have demonstrated the technical thoughts and characteristics of the present invention, enabling the persons skilled in the art to understand, make, and use the present invention. However, the embodiments are only to exemplify the present invention but not to limit the scope of the present invention. Any equivalent modification or variation according to the spirit of the present invention is to be also included within the scope of the present invention.

What is claimed is:

1. An intelligent power control system, which connects between a LED (Light Emitting Diode) power adaptor and a LED light string and drives said LED light string to emit light, comprising:
   a sensing-modulating-setting (SMS) unit, for sensing an infrared signal and generating a plurality of brightness-selection signals; and
   a digital power control unit connecting with said SMS unit and regulating output power thereof according to said infrared signal and said brightness-selection signal of said SMS unit to modulate brightness of light emitted by said LED light string;
   wherein said SMS unit includes:
   a light modulator having a signal-processing unit, a signal detection unit, a digital control signal output unit, and a brightness-setting unit, wherein said signal-processing unit is connected with said signal detection unit, said digital control signal output unit, and said brightness-setting unit, and wherein said brightness-setting unit generates said brightness-selection signals, and wherein said brightness-selection signals are respectively corresponding to different delay times; and
   at least one infrared sensor connected with said signal detection unit, wherein said signal-procession unit controls level of voltage output by said digital control signal output unit to modulate brightness of light emitted by said LED light string according to a detection result of said infrared sensor and one said delay time corresponding to one said brightness-selection signal.

2. The intelligent power control system according to claim 1, wherein said light modulator further has a power supply unit connected with said LED power adaptor.

3. The intelligent power control system according to claim 1, wherein said SMS unit further includes a signal amplification unit connected with said signal detection unit and used to amplify detection results of said infrared sensor.

4. The intelligent power control system according to claim 3, wherein said signal amplification unit and one of said light modulator and said infrared sensor are integrated on a single chip.

5. The intelligent power control system according to claim 1, wherein said SMS unit further includes a photoresistor sensor to detect signals.

6. The intelligent power control system according to claim 1, wherein said brightness-setting unit includes:
   a brightness-selection switch, for generating said brightness-selection signals; and
   a delay time-adjusting switch, for generating said delay times respectively corresponding to said brightness-selection signals.

7. The intelligent power control system according to claim 1, wherein said light modulator and said infrared sensor are integrated on a SOC (System-on-Chip).

8. The intelligent power control system according to claim 1, wherein said digital power control unit includes a low-voltage power supply circuit connected with said LED power adaptor, an output power control signal processing unit connected with said SMS unit, an output power conversion and filtering circuit connected with said LED light string, and an output power control unit connected with said low-voltage power supply circuit, said output power control signal processing unit and said output power conversion and filtering circuit.

9. The intelligent power control system according to claim 8, wherein said digital power control unit further includes an input protection unit connected with said LED power adaptor and said low-voltage power supply circuit.

10. The intelligent power control system according to claim 8, wherein said digital power control unit further includes a detection signal conversion circuit, an overcurrent detection circuit and an overvoltage detection circuit, and wherein said detection signal conversion circuit is connected with said output power control signal processing unit, and wherein said overcurrent detection circuit and said overvoltage detection circuit are connected in parallel and each connected with said detection signal conversion circuit, said output power conversion and filtering circuit and said LED light string.

11. The intelligent power control system according to claim 1, wherein said SMS unit is connected with a plurality of said digital power control units and controls brightnesses of lights emitted by a plurality of said LED light strings each connected with one of said digital power control units.

12. The intelligent power control system according to claim 1 further comprising an external electronic device that is connected between said SMS unit and said digital power control unit and controls brightness of light emitted by said LED light string.

13. An intelligent power control system, which connects between a LED (Light Emitting Diode) power adaptor and a LED light string and drives said LED light string to emit light, comprising:
a sensing-modulating-setting (SMS) unit, for sensing an infrared signal and generating a plurality of brightness-selection signals; and
a digital power control unit connecting with said SMS unit and regulating output power thereof according to said infrared signal and said brightness-selection signal of said SMS unit to modulate brightness of light emitted by said LED light string;
wherein said digital power control unit includes a low-voltage power supply circuit connected with said LED power adaptor, an output power control signal processing unit connected with said SMS unit, an output power conversion and filtering circuit connected with said LED light string, and an output power control unit connected with said low-voltage power supply circuit, said output power control signal processing unit and said output power conversion and filtering circuit.

14. The intelligent power control system according to claim 13, wherein said digital power control unit further includes an input protection unit connected with said LED power adaptor and said low-voltage power supply circuit.

15. The intelligent power control system according to claim 13, wherein said digital power control unit further includes a detection signal conversion circuit, an overcurrent detection circuit and an overvoltage detection circuit, and wherein said detection signal conversion circuit is connected with said output power control signal processing unit, and wherein said overcurrent detection circuit and said overvoltage detection circuit are connected in parallel and each connected with said detection signal conversion circuit, said output power conversion and filtering circuit and said LED light string.

16. The intelligent power control system according to claim 13, wherein said SMS unit includes
a light modulator having a signal-processing unit, a signal detection unit, a digital control signal output unit, and a brightness-setting unit, wherein said signal-processing unit is connected with said signal detection unit, said digital control signal output unit, and said brightness-setting unit, and wherein said brightness-setting unit generates said brightness-selection signals, and wherein said brightness-selection signals are respectively corresponding to different delay times; and
at least one infrared sensor connected with said signal detection unit, wherein said signal-procession unit controls level of voltage output by said digital control signal output unit to modulate brightness of light emitted by said LED light string according to a detection result of said infrared sensor and one said delay time corresponding to one said brightness-selection signal;
wherein said light modulator further has a power supply unit connected with said LED power adaptor.

17. The intelligent power control system according to claim 13, wherein said SMS unit includes
a light modulator having a signal-processing unit, a signal detection unit, a digital control signal output unit, and a brightness-setting unit, wherein said signal-processing unit is connected with said signal detection unit, said digital control signal output unit, and said brightness-setting unit, and wherein said brightness-setting unit generates said brightness-selection signals, and wherein said brightness-selection signals are respectively corresponding to different delay times; and
at least one infrared sensor connected with said signal detection unit, wherein said signal-procession unit controls level of voltage output by said digital control signal output unit to modulate brightness of light emitted by said LED light string according to a detection result of said infrared sensor and one said delay time corresponding to one said brightness-selection signal;
wherein said SMS unit further includes a signal amplification unit connected with said signal detection unit and used to amplify detection results of said infrared sensor.

18. The intelligent power control system according to claim 17, wherein said signal amplification unit and one of said light modulator and said infrared sensor are integrated on a single chip.

19. The intelligent power control system according to claim 13, wherein said SMS unit includes
a light modulator having a signal-processing unit, a signal detection unit, a digital control signal output unit, and a brightness-setting unit, wherein said signal-processing unit is connected with said signal detection unit, said digital control signal output unit, and said brightness-setting unit, and wherein said brightness-setting unit generates said brightness-selection signals, and wherein said brightness-selection signals are respectively corresponding to different delay times; and
at least one infrared sensor connected with said signal detection unit, wherein said signal-procession unit controls level of voltage output by said digital control signal output unit to modulate brightness of light emitted by said LED light string according to a detection result of said infrared sensor and one said delay time corresponding to one said brightness-selection signal;
wherein said SMS unit further includes a photoresistor sensor to detect signals.

20. The intelligent power control system according to claim 13, wherein said SMS unit includes
a light modulator having a signal-processing unit, a signal detection unit, a digital control signal output unit, and a brightness-setting unit, wherein said signal-processing unit is connected with said signal detection unit, said digital control signal output unit, and said brightness-setting unit, and wherein said brightness-setting unit generates said brightness-selection signals, and wherein said brightness-selection signals are respectively corresponding to different delay times; and at least one infrared sensor connected with said signal detection unit, wherein said signal-procession unit controls level of voltage output by said digital control signal output unit to modulate brightness of light emitted by said LED light string according to a detection result of said infrared sensor and one said delay time corresponding to one said brightness-selection signal;

wherein said brightness-setting unit includes:

a brightness-selection switch, for generating said brightness-selection signals; and a delay time-adjusting switch, for generating said delay times respectively corresponding to said brightness-selection signals.

21. The intelligent power control system according to claim 13, wherein said SMS unit includes a light modulator having a signal-processing unit, a signal detection unit, a digital control signal output unit, and a brightness-setting unit, wherein said signal-processing unit is connected with said signal detection unit, said digital control signal output unit, and said brightness-setting unit, and wherein said brightness-setting unit generates said brightness-selection signals, and wherein said brightness-selection signals are respectively corresponding to different delay times; and at least one infrared sensor connected with said signal detection unit, wherein said signal-procession unit controls level of voltage output by said digital control signal output unit to modulate brightness of light emitted by said LED light string according to a detection result of said infrared sensor and one said delay time corresponding to one said brightness-selection signal;

wherein said light modulator and said infrared sensor are integrated on a SOC (System-on-Chip).

22. The intelligent power control system according to claim 13, wherein said SMS unit is connected with a plurality of said digital power control units and controls brightnesses of lights emitted by a plurality of said LED light strings each connected with one of said digital power control units.

23. The intelligent power control system according to claim 13 further comprising an external electronic device that is connected between said SMS unit and said digital power control unit and controls brightness of light emitted by said LED light string.

* * * * *